(12) United States Patent
Yun et al.

(10) Patent No.: US 8,526,721 B2
(45) Date of Patent: Sep. 3, 2013

(54) PROCESSING IMAGE DATA

(75) Inventors: Kwansoo Yun, Suwon-si (KR); Joshi Akshay, Karnataka (IN); Sangdo Cho, Seongnam-si (KR); Yongsik Kim, Suwon-si (KR); Jaewoo Joung, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 1105 days.

(21) Appl. No.: 12/457,944

(22) Filed: Jun. 25, 2009

(65) Prior Publication Data
US 2010/0002931 A1    Jan. 7, 2010

(30) Foreign Application Priority Data
Jul. 1, 2008  (KR) ................. 10-2008-0063654

(51) Int. Cl.
G06K 9/34 (2006.01)
G06K 9/00 (2006.01)
G06K 9/42 (2006.01)
B41J 29/38 (2006.01)
B41J 2/205 (2006.01)
B41J 2/05 (2006.01)

(52) U.S. Cl.
USPC ............ 382/164; 382/133; 382/256; 347/9; 347/15; 347/57

(58) Field of Classification Search
None
See application file for complete search history.

(56) References Cited

U.S. PATENT DOCUMENTS

| 4,935,821 A * | 6/1990 | Sano et al. ............... 358/401 |
| 5,018,212 A * | 5/1991 | Manns et al. ............ 382/145 |
| 5,050,228 A * | 9/1991 | Yoshida et al. .......... 382/256 |
| 5,309,526 A * | 5/1994 | Pappas et al. ............ 382/237 |
| 5,852,679 A * | 12/1998 | Shimizu .................. 382/180 |
| 6,278,797 B1 * | 8/2001 | Nagasaki et al. ........ 382/146 |
| 7,216,947 B2 * | 5/2007 | Kusunoki ................... 347/9 |
| 7,314,269 B2 * | 1/2008 | Kusunoki ................. 347/57 |
| 7,511,847 B2 * | 3/2009 | Silverbrook et al. ...... 358/1.15 |
| 8,191,980 B2 * | 6/2012 | Yun et al. .................. 347/9 |
| 8,351,070 B2 * | 1/2013 | Yun et al. ................. 358/1.2 |
| 2003/0099394 A1 * | 5/2003 | Shimazawa .............. 382/164 |
| 2003/0198385 A1 * | 10/2003 | Tanner et al. ............ 382/195 |
| 2005/0018227 A1 * | 1/2005 | Takahashi et al. ........ 358/1.9 |
| 2006/0203023 A1 * | 9/2006 | Tatsumi ................... 347/15 |
| 2008/0279441 A1 * | 11/2008 | Matsuo et al. ........... 382/133 |
| 2009/0079782 A1 * | 3/2009 | Sasayama ................ 347/19 |
| 2009/0167803 A1 * | 7/2009 | Uchiyama et al. ........ 347/15 |

* cited by examiner

*Primary Examiner* — Ryan Zeender
*Assistant Examiner* — Dana Amsdell

(57) ABSTRACT

A method of processing image data, to obtain image data for printing a junction area connecting a circular pad having a radius R with a linear line pattern by forming ink blots having a radius r in an overlapping manner, includes: setting a base pitch P as a base distance between adjacent ink blots; arranging image data of the pad, line pattern, and junction area, which is defined by an extension of the line pattern, in an x-y coordinate system; selecting a first determination point, which corresponds to one side of the junction area; comparing a distance from a center of the pad to the first determination point with a value of (R−r+P); and storing coordinates of the first determination point as print data if the distance from the center of the pad to the first determination point is greater than or equal to the value of (R−r+P).

16 Claims, 11 Drawing Sheets

PROCESSING IMAGE DATA

CROSS-REFERENCE TO RELATED APPLICATIONS

This application claims the benefit of Korean Patent Application No. 10-2008-0063654 filed with the Korean Intellectual Property Office on Jul. 1, 2008, the disclosure of which is incorporated herein by reference in its entirety.

BACKGROUND

1. Technical Field

The present invention relates to a method of processing image data and to a recorded medium tangibly embodying a set of instructions for implementing the method.

2. Description of the Related Art

Currently, inkjet printing technology is widely being used, not only in office applications, but also in industrial applications. One such example is the use of inkjet printing in processes for manufacturing a printed circuit board (PCB).

A printed circuit board may generally be designed using a layout software, where the design may include various shapes (for example, wide lines, circles, arcs, polygons, hollow circles, and interconnections). In printing these various shapes, an inkjet printer may eject ink droplets, which may form ink blots having a circular shape.

Since the inkjet printer may operate based on a raster image format, the various shapes may have to be filled with simulated ink blots, i.e. circles, and then saved as an image file format.

In order to ensure smoothness and avoid empty areas and thus provide the resolution and ink density required by the user, it is needed to carefully place the ink blots along the boundaries and in the interiors of the shapes that are to be printed.

SUMMARY

An aspect of the invention provides a method of processing image data and a recorded medium tangibly embodying a set of instructions for implementing the method, which can be utilized to print pads with a high level of surface smoothness and high reliability.

Another aspect of the invention provides a method of processing image data to obtain image data for printing a junction area connecting a circular pad having a radius R with a linear line pattern by forming ink blots having a radius r in an overlapping manner. The method can include: setting a base pitch P as a base distance between adjacent ink blots; arranging image data of the pad, the line pattern, and the junction area, which is defined by an extension of the line pattern, in an x-y coordinate system; selecting a first determination point, which corresponds to one side of the junction area; comparing a distance from a center of the pad to the first determination point with a value of $(R-r+P)$; and storing coordinates of the first determination point as print data if the distance from the center of the pad to the first determination point is greater than or equal to the value of $(R-r+P)$.

Here, the image data can be obtained by converting vector data of the pad and the line pattern using Bresenham's algorithm, and the first determination point can be separated by r from one side of the junction area.

The pad and the line pattern can be tangent to each other.

After the storing of the coordinates of the first determination point as print data, the method may further include: selecting a second determination point that is separated by a unit distance from the first determination point in a direction towards an inside of the junction area; comparing a distance from the first determination point to the second determination point with the value P; and moving the second determination point by a unit distance towards the inside of the junction, if the distance from the first determination point to the second determination point is less than the value P.

Also, if the distance from the first determination point to the second determination point is greater than or equal to the value P, the method may further include comparing a distance from a center of the pad to the second determination point with the value $(R-r+P)$; and storing coordinates of the second determination point as print data, if the distance from the center of the pad to the second determination point is less than the value $(R-r+P)$.

Furthermore, after the storing of the coordinates of the first determination point as print data, the method may further include: selecting a third determination point that is separated by a unit distance from the first determination point in a direction parallel to one side of the junction area; comparing a distance from the first determination point to the third determination point with the value P; and moving the third determination point by a unit distance in a direction parallel to one side of the junction area, if the distance from the first determination point to the third determination point is less than the value P.

Conversely, if the distance from the first determination point to the third determination point is greater than or equal to the value P, the method may further include comparing a distance from a center of the pad to the third determination point with the value of $(R-r+P)$; and storing coordinates of the third determination point as print data, if the distance from the center of the pad to the third determination point is greater than or equal to the value of $(R-r+P)$.

Additional aspects and advantages of the present invention will be set forth in part in the description which follows, and in part will be obvious from the description, or may be learned by practice of the invention.

DETAILED DESCRIPTION

Figure 1:
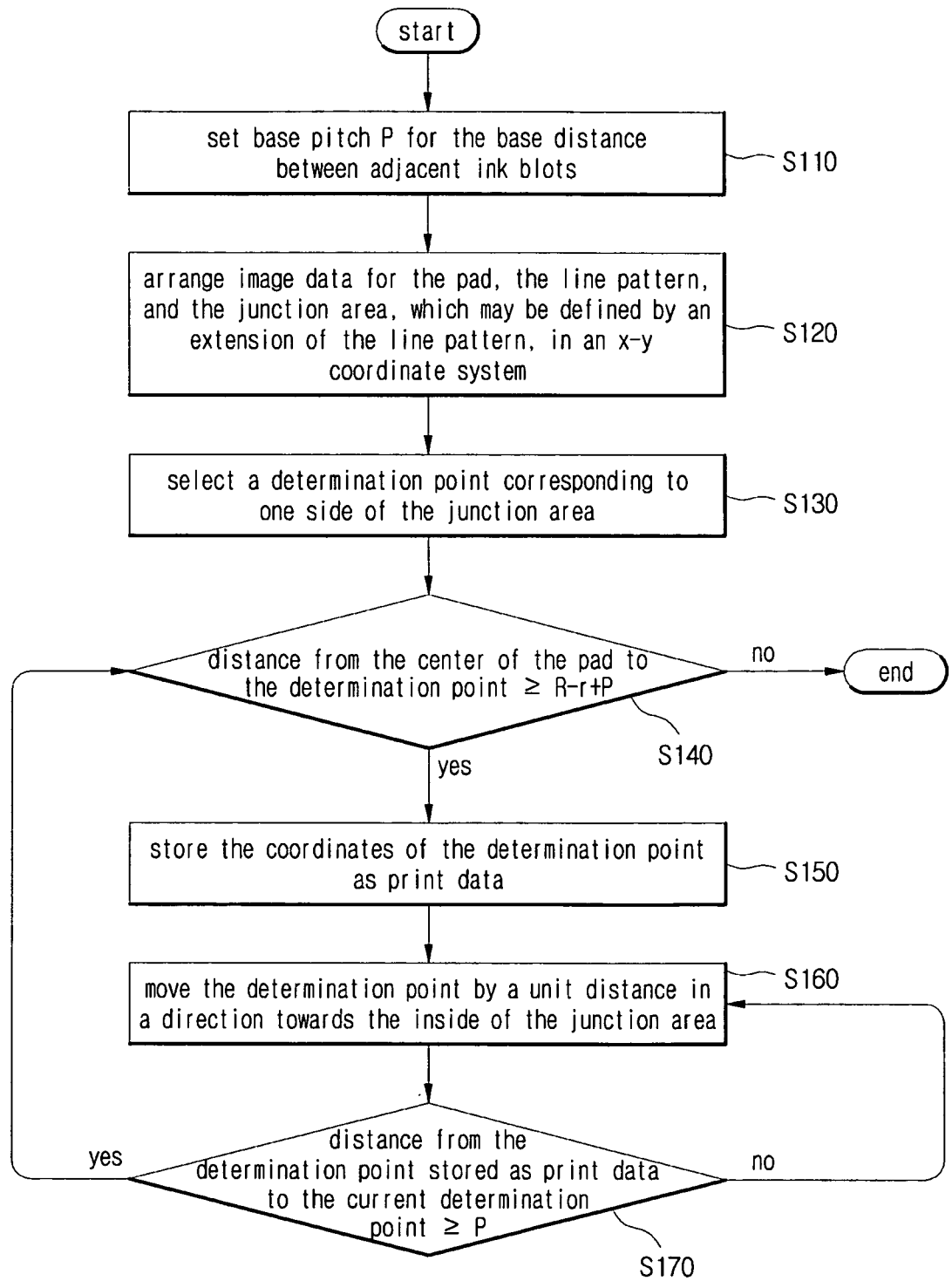
FIG. 1 is a flowchart illustrating a method of processing image data according to an embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Certain embodiments of the invention will be described below in more detail with reference to the accompanying drawings. Those components that are the same or are in correspondence are rendered the same reference numeral regardless of the figure number, and redundant explanations are omitted.

Figure 2:
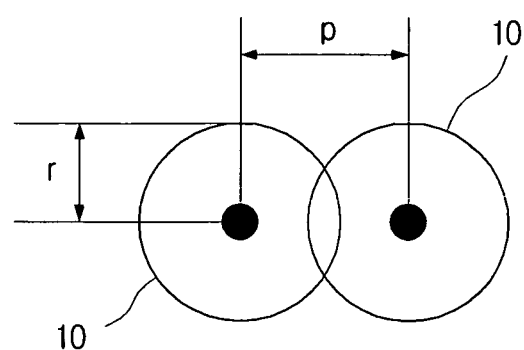
FIG. 2 is a plan view illustrating ink blots formed in an overlapping manner.
Figure 3:
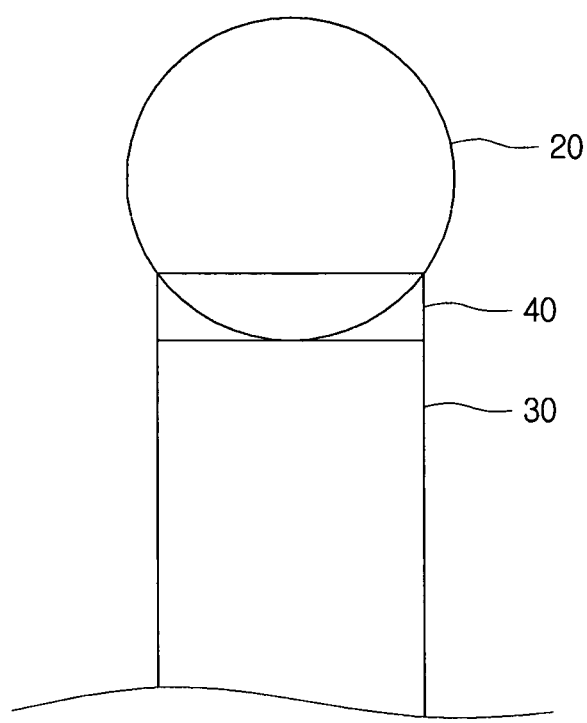
FIG. 3 is a plan view illustrating a pad, a line pattern, and a junction area.

FIG. 1 is a flowchart illustrating a method of processing image data according to an embodiment of the invention, FIG. 2 is a plan view illustrating ink blots formed in an overlapping manner, FIG. 3 is a plan view illustrating a pad, a line pattern, and a junction area, and FIG. 4 through FIG. 9 are drawings representing a flow diagram for a method of processing image data according to an embodiment of the invention.

First, various settings can be configured and inputted (S110), such as the radius R of the pad to be printed, the radius r of the ejected ink blots, and the base pitch P, which is a value representing the degree to which the ink blots overlap.

As illustrated in FIG. 2, the radius of an ink blot 10 refers to the radius of the circular mark formed as the ink hits the substrate, etc., not the radius of the spherical ink droplet before it hits the substrate, etc.

The pitch refers to the distance between the center points of ink blots 10 that are formed in a partially overlapping manner, as illustrated in FIG. 2. The base pitch P can be the base value of the pitch as intended by the designer.

Afterwards, as illustrated in FIG. 3, the image data of the pad 20, the line pattern 30, and the junction area 40, which may be defined by an extension of the line pattern 30, can be arranged in an x-y coordinate system (S120). The x-y coordinate system can be established with various values for the unit distance, etc., according to the resolution (dpi) desired by the designer. The image data 20, 30, 40 can be vector data, such as Gerber data, etc., or data converted from the vector data using Bresenham's algorithm.

Here, the junction area 40 refers to an area overlapping the pad 20 and/or the line pattern 30 such that the circular pad 20 and the liner line pattern 30 may be connected. The junction area 40 can be located on an extension of the line pattern 30, as illustrated in FIG. 3.

FIG. 3 shows the circular pad 20 and the liner line pattern 30 formed tangent to each other. When the pad 20 and the line pattern 30 are tangent to each other, as in this case, the junction area 40 can be minimized, and the processes of acquiring print data for the junction area 40 can be reduced.

Although it is not illustrated in FIG. 3, it is to be appreciated that the pad 20 and the line pattern 30 can be separated from each other.

Figure 4:
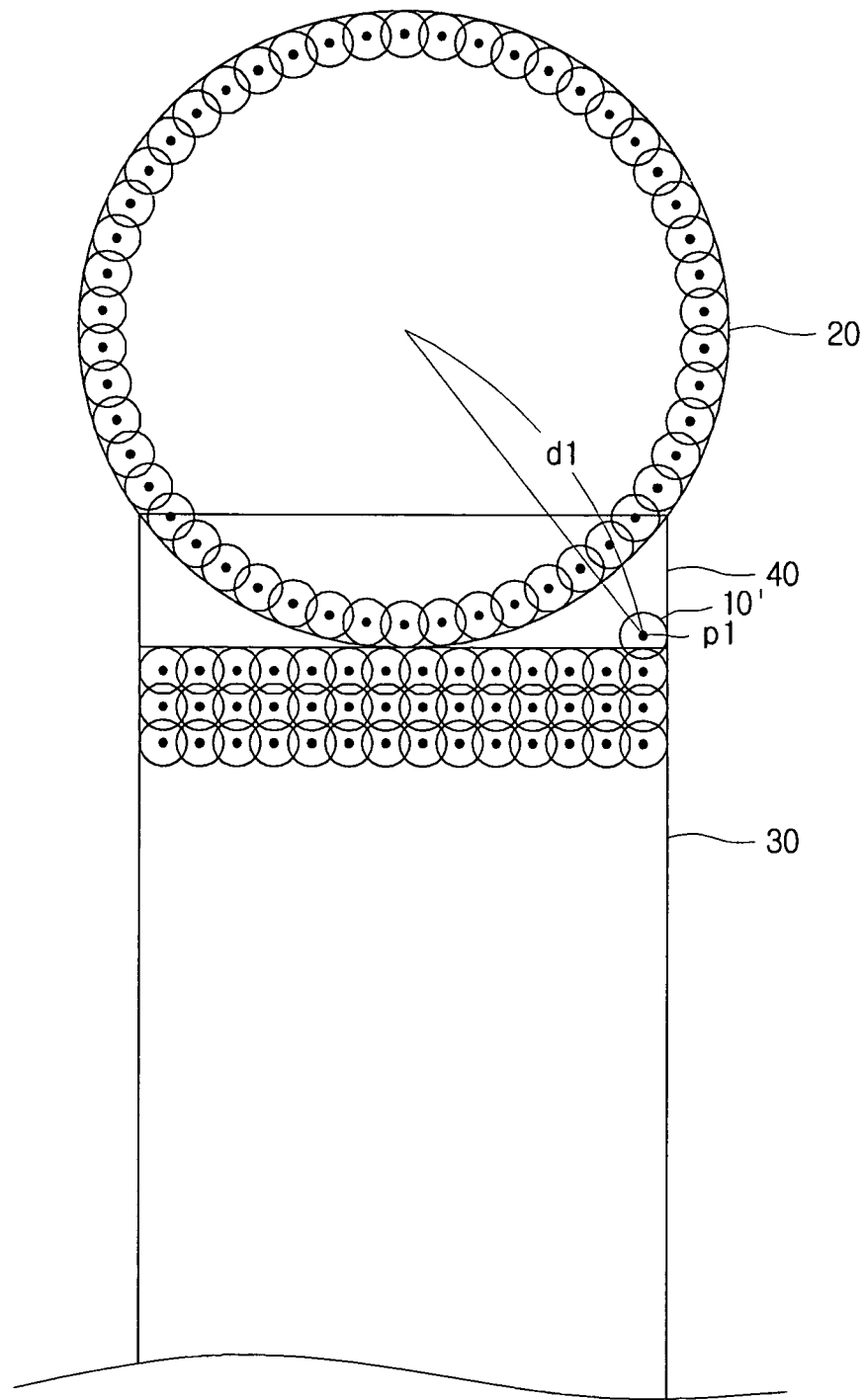
FIG. 4, FIG. 5, FIG. 6, FIG. 7, FIG. 8, FIG. 9, FIG. 10, and FIG. 11 are drawings representing a flow diagram for a method of processing image data according to an embodiment of the invention.

Afterwards, a determination point p1 can be selected corresponding to one side of the junction area 40 (S130), as illustrated in FIG. 4. Here, the one side of the junction area 40 refers to the outmost point on the left or right side of the junction area 40, where the determination point can be selected using this as a basis.

In FIG. 4, the determination point p1 can be selected as a point separated from the right side of the junction area 40 by r, the radius of an ink blot. If the determination point p1 is thus selected at a position separated by ink radius r from the right side of the junction area 40, the effect of the ink spreading beyond the extension of the line pattern 30 can be minimized, when the ink is ejected at the relevant position.

The reference numeral 10' of FIG. 4 represents a simulated ink blot, taking into consideration the size of an ink droplet ejected from an inkjet head.

After thus selecting the determination point p1, the distance between the center of the pad 20 and the determination point p1 can be compared with the value of (the radius r of the pad 20−the radius r of an ink blot+the base pitch P) (S140).

If the comparison results show that the distance from the center of the pad to the first determination point is greater than or equal to the value of (R−r+P), the coordinates of the first determination point can be stored as print data (S150).

If the distance from the center of the pad to the determination point p1 is less than the value of (R−r+P), it can be assumed that sufficient print data has been acquired for connecting the pad 20 with the line pattern 30, and it may not be necessary to acquire separate print data for the junction area 40.

Figure 5:
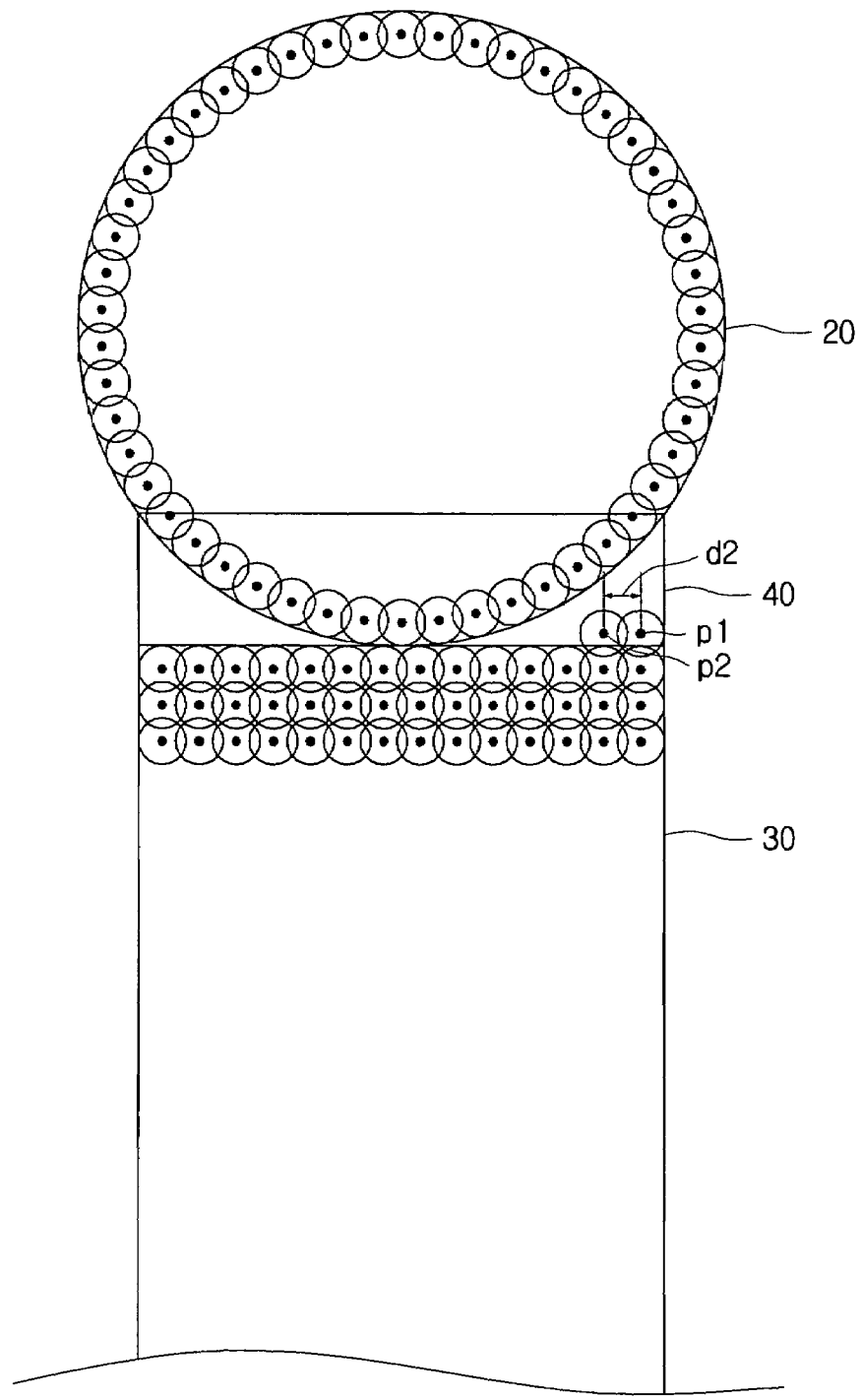

After storing the coordinates of the determination point p1 as print data, as illustrated in FIG. 5, and moving the determination point by a unit distance in a direction towards the inside of the junction area 40 (S160), the distance from the determination point p1 stored as print data with the current determination point p2 can be compared with the base pitch P (S170).

Figure 6:
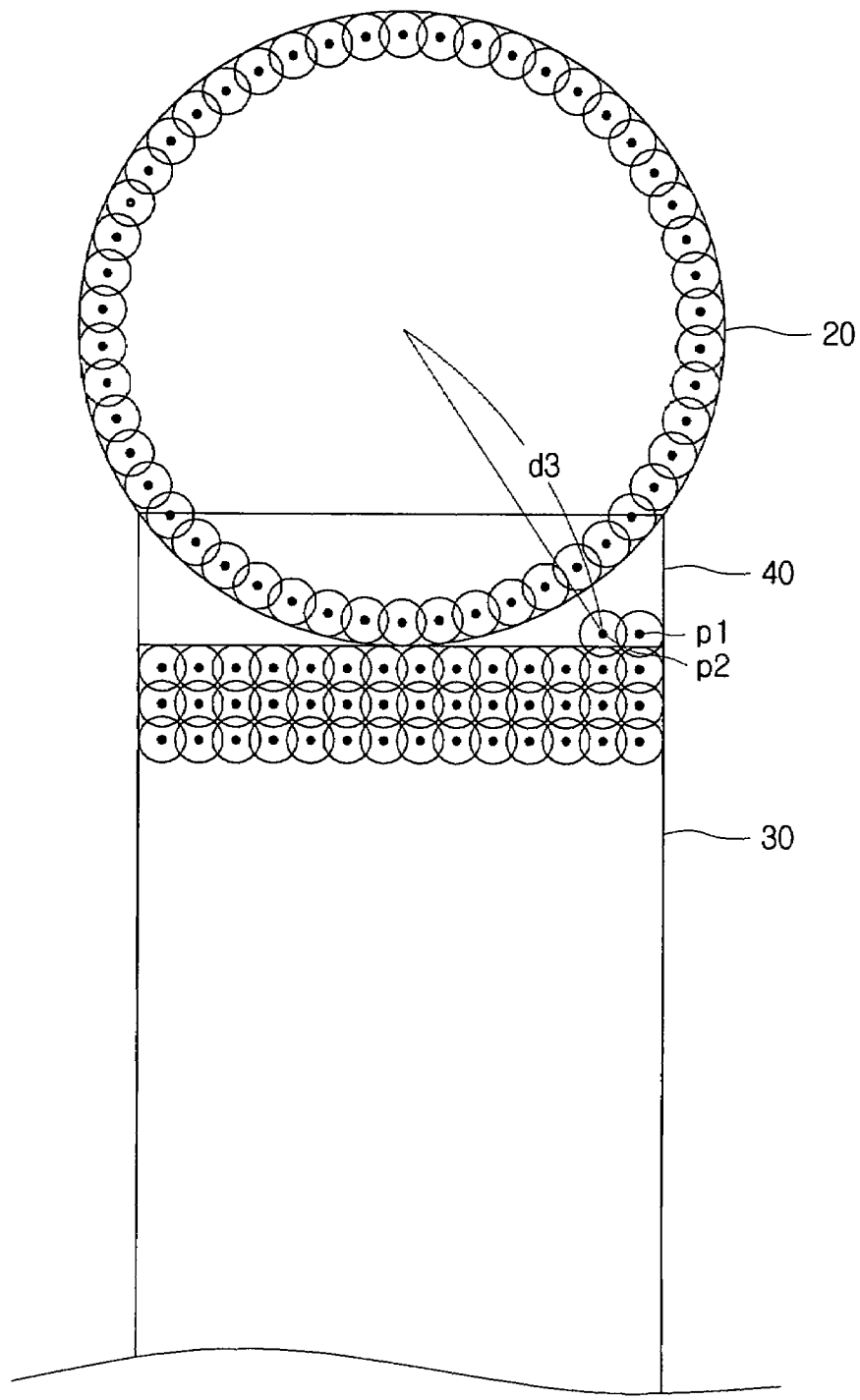

If the comparison results show that the distance d2 from the determination point p1 to the current determination point p2 is greater than or equal to the base pitch, the distance d3 from the center of the pad 20 to the current determination point p2 can be compared with the value of (the radius R of the pad 20−the radius r of ink blots+the base pitch P) (S140), as shown in FIG. 6. If the distance d3 from the center of the pad 20 to the current determination point p2 is greater than or equal to the value of (R−r+P), the coordinates of the current determination point p2 can be stored as print data (S150).

Conversely, if the distance d2 from the previous determination point p1 to the current determination point p2 is less than the base pitch, the process of S170 can be repeated after moving the determination point p2 by a unit distance towards the inside of the junction area 40 (S160).

Figure 7:
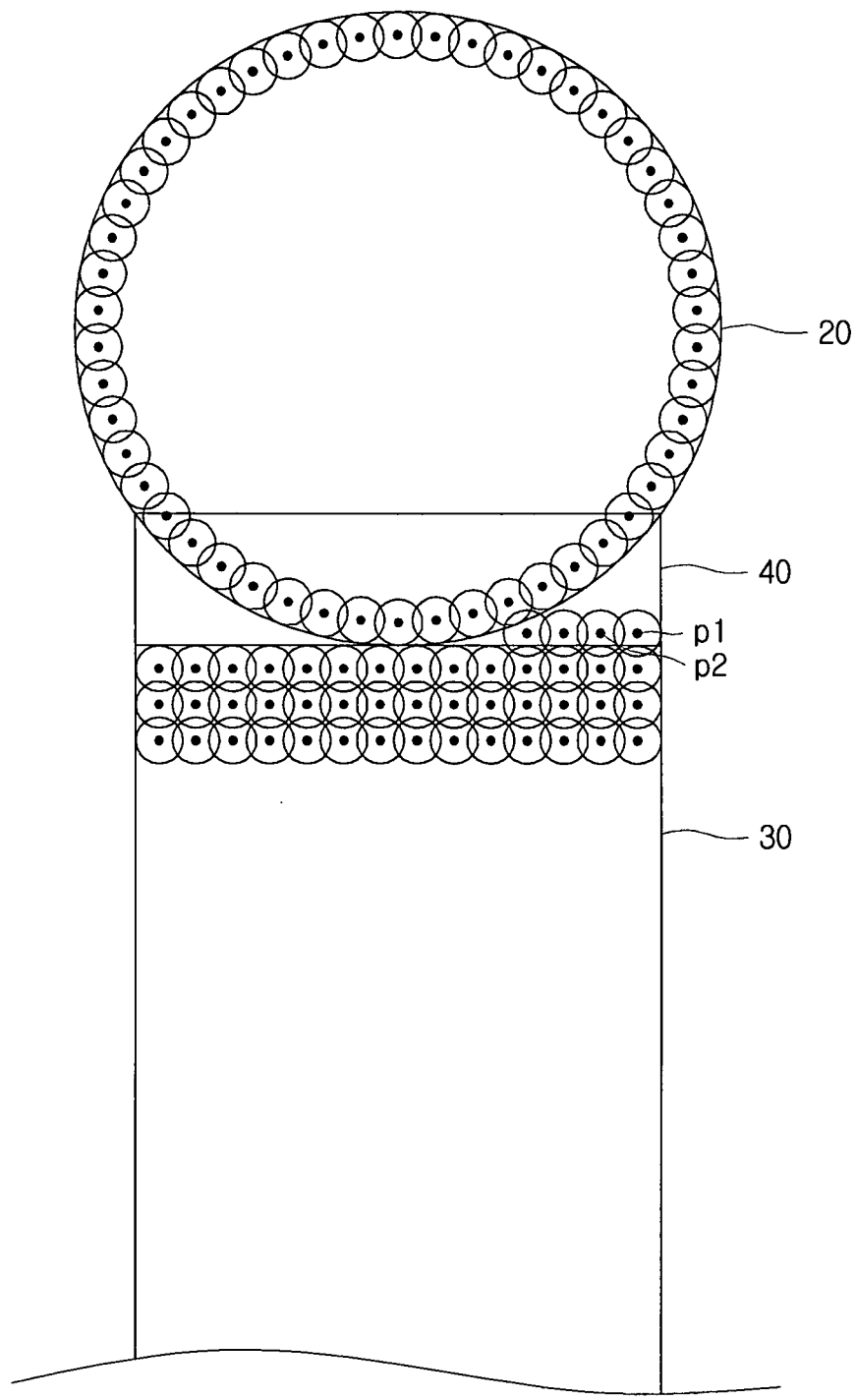

FIG. 7 shows the print data from the first determination point p1 in a direction towards the inside of the line pad 20, obtained by the processes described above.

Figure 8:
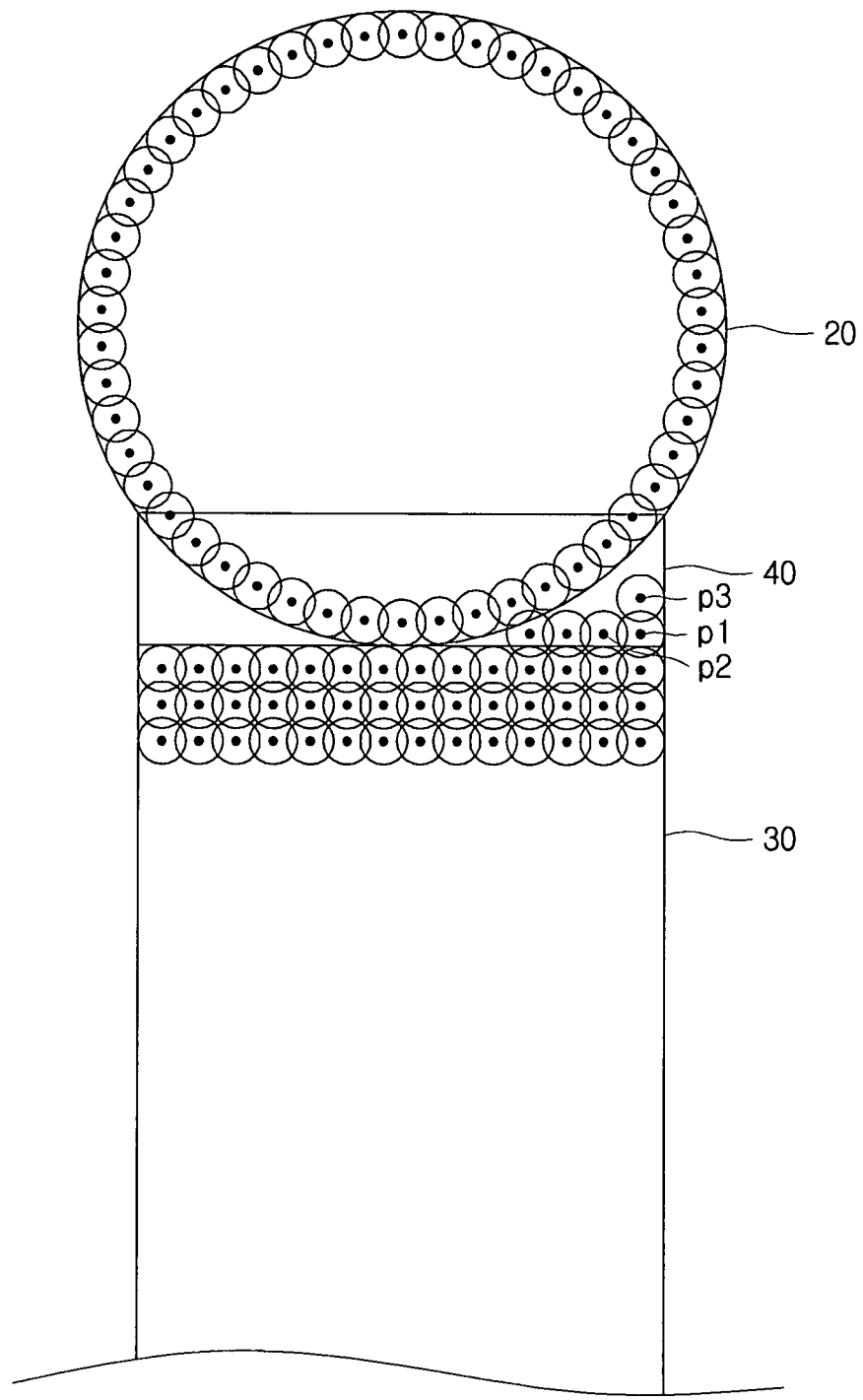

Next, as shown in FIG. 8, the first determination point p1 can be moved by a unit distance in a direction parallel to the one side of the junction area 40, after which the distance from the determination point p1 to the current determination point p3 can be compared with the base patch.

If the comparison results show that the distance from the determination point p1 to the current determination point p3 is greater than or equal to the base pitch, the distance from the center of the pad to the current determination point p3 can be compared with the value of (the radius R of the pad 20−the radius r of ink blots+the base pitch P), and then if the distance from the center of the pad to the current determination point p3 is greater than or equal to the value of (R−r+P), the coordinates of the current determination point can be stored as print data.

Of course, if the distance from the determination point p1 to the current determination point p3 is less than the base pitch, the process of S170 can be repeated after moving the determination point by a unit distance in a direction parallel to side of the junction area 40.

Afterwards, the operations for acquiring print data in a direction towards the inside of the junction area 40 can be repeated. The procedures performed for these operations are substantially the same or similar to the procedures set forth above, and thus will not be described here in detail.

Figure 9:
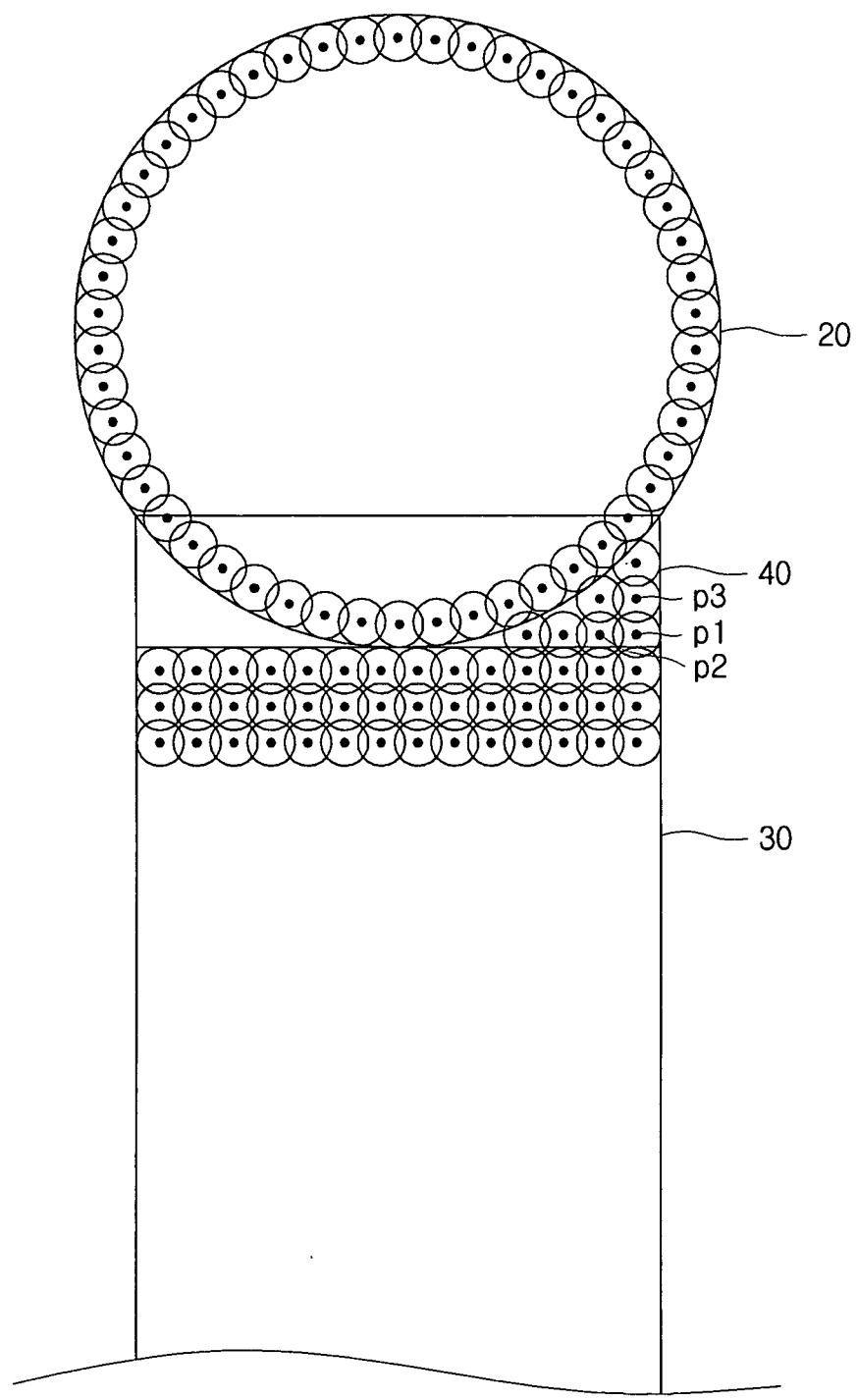

FIG. 9 shows the print data for the right side of the junction area 40, obtained by the processes described above.

It is apparent that the print data for the left side of the junction area 40 may also be obtained using substantially the same procedures as those set forth above, and it is to be appreciated that, if the junction area 40 is symmetrical about the point of contact between the pad 20 and the line pattern 30, the print data for the opposite side can be acquired mathematically using mirror image conversion.

Figure 10:
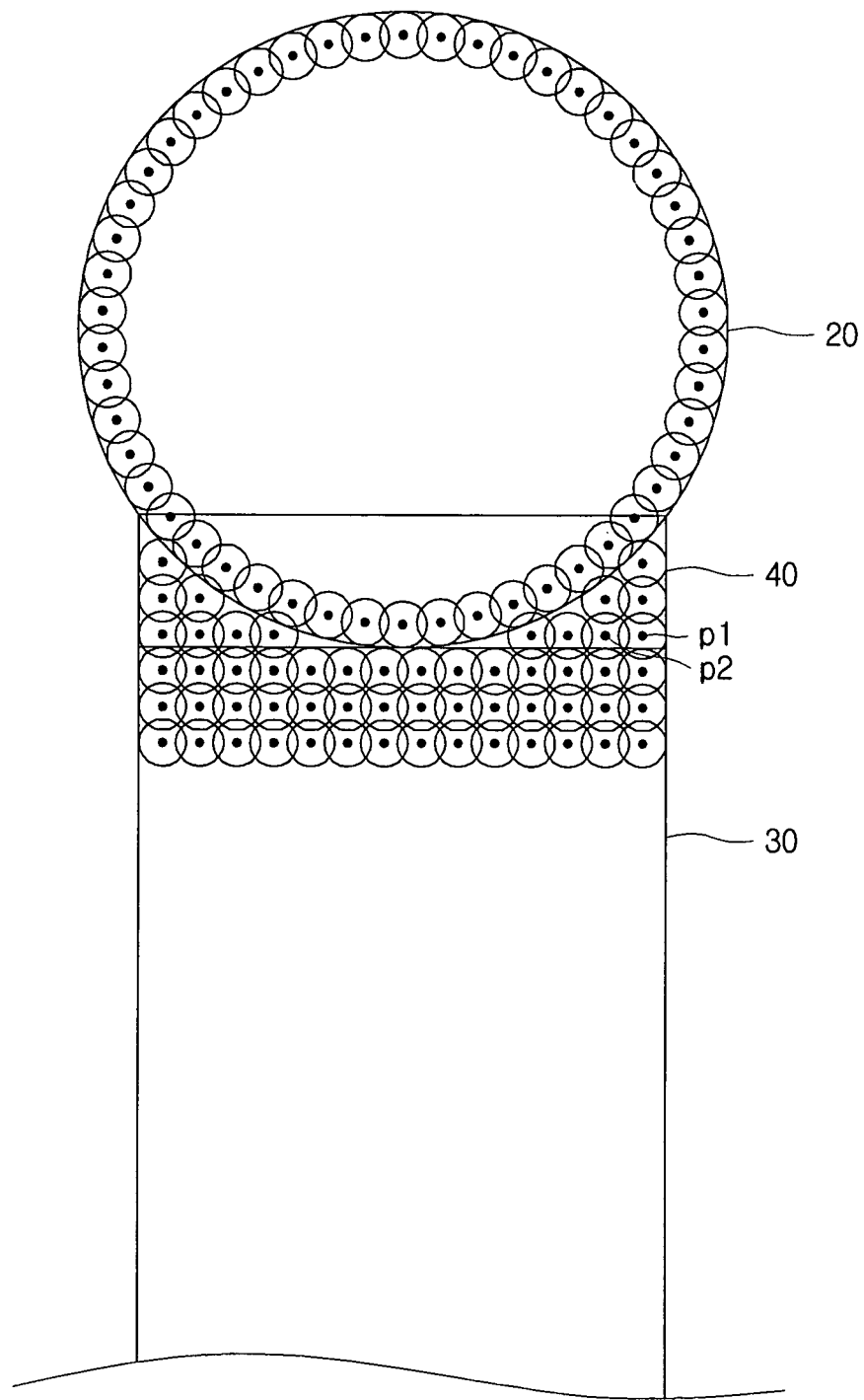
Figure 11:
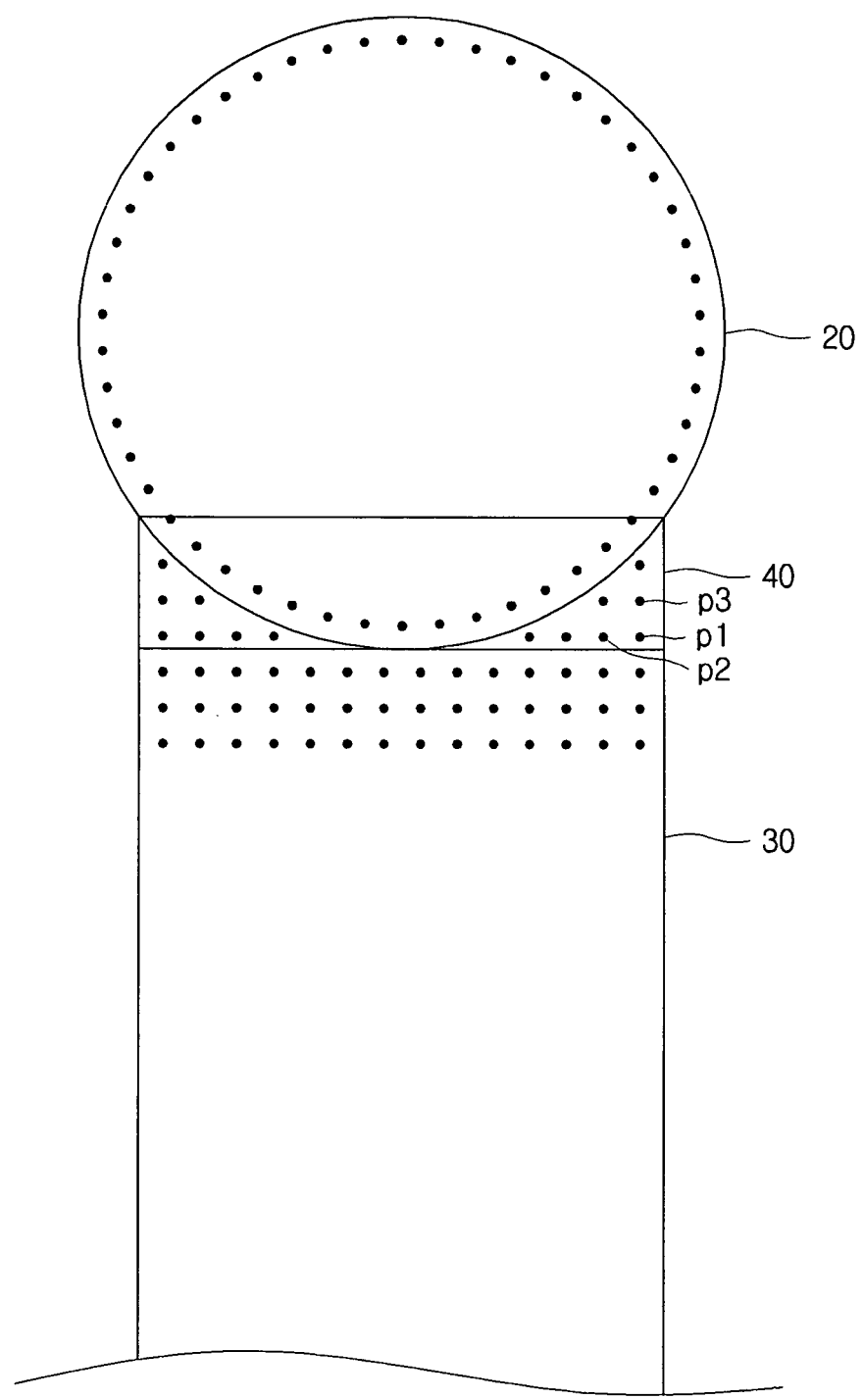

The print data for the junction area 40 obtained using the procedures set forth above is illustrated in FIG. 10 and FIG. 11. The dots illustrated in FIG. 11 show the positions where ink may be ejected from the inkjet head.

Generalized and detailed aspects of the method of processing image data, as disclosed using the present embodiment, can be tangibly implemented as a recorded medium readable by a computer, etc., that stores a program of instructions executable by the computer, etc.

By utilizing certain embodiments of the invention as set forth above, a pad can be printed with a high level of surface smoothness and high reliability to satisfy the resolution and ink density requirements needed by the user.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

Many embodiments other than those set forth above can be found in the appended claims.

What is claimed is:

1. A method of processing image data to obtain image data for printing a junction area connecting a circular pad having a radius R with a linear line pattern by forming ink blots having a radius r in an overlapping manner, the method comprising:
    setting a base pitch P as a base distance between adjacent ink blots;
    arranging image data of the pad, the line pattern, and the junction area in an x-y coordinate system, the junction area defined by an extension of the line pattern;
    selecting a first determination point, the first determination point corresponding to one side of the junction area;
    comparing, by a computer, a distance from a center of the pad to the first determination point with a value of $(R-r+P)$; and
    storing coordinates of the first determination point as print data if the distance from the center of the pad to the first determination point is greater than or equal to the value of $(R-r+P)$.

2. The method of claim 1, wherein the image data is obtained by converting vector data of the pad and the line pattern using Bresenham's algorithm.

3. The method of claim 1, wherein the first determination point is separated by r from one side of the junction area.

4. The method of claim 1, wherein the pad and the line pattern are tangent to each other.

5. The method of claim 1, further comprising, after the storing of the coordinates of the first determination point as print data:
    selecting a second determination point, the second determination point separated by a unit distance from the first determination point in a direction towards an inside of the junction area;
    comparing a distance from the first determination point to the second determination point with the value P; and
    moving the second determination point by a unit distance towards the inside of the junction if the distance from the first determination point to the second determination point is less than the value P.

6. The method of claim 5, further comprising, if the distance from the first determination point to the second determination point is greater than or equal to the value P:
    comparing a distance from a center of the pad to the second determination point with the value $(R-r+P)$; and
    storing coordinates of the second determination point as print data if the distance from the center of the pad to the second determination point is less than the value $(R-r+P)$.

7. The method of claim 1, further comprising, after the storing of the coordinates of the first determination point as print data:
    selecting a third determination point, the third determination point separated by a unit distance from the first determination point in a direction parallel to one side of the junction area;
    comparing a distance from the first determination point to the third determination point with the value P; and
    moving the third determination point by a unit distance in a direction parallel to one side of the junction area if the distance from the first determination point to the third determination point is less than the value P.

8. The method of claim 7, further comprising, if the distance from the first determination point to the third determination point is greater than or equal to the value P:
    comparing a distance from a center of the pad to the third determination point with the value of $(R-r+P)$; and
    storing coordinates of the third determination point as print data if the distance from the center of the pad to the third determination point is greater than or equal to the value of $(R-r+P)$.

9. A non-transitory recorded medium tangibly embodying a program of instructions for performing method of processing image data to obtain image data for printing a junction area connecting a circular pad having a radius R with a linear line pattern by forming ink blots having a radius r in an overlapping manner, the method comprising:
    setting a base pitch P as a base distance between adjacent ink blots;
    arranging image data of the pad, the line pattern, and the junction area in an x-y coordinate system, the junction area defined by an extension of the line pattern;
    selecting a first determination point, the first determination point corresponding to one side of the junction area;
    comparing a distance from a center of the pad to the first determination point with a value of $(R-r+P)$; and
    storing coordinates of the first determination point as print data if the distance from the center of the pad to the first determination point is greater than or equal to the value of $(R-r+P)$.

10. The recorded medium of claim 9, wherein the image data is obtained by converting vector data of the pad and the line pattern using Bresenham's algorithm.

11. The recorded medium of claim 9, wherein the first determination point is separated by r from one side of the junction area.

12. The recorded medium of claim 9, wherein the pad and the line pattern are tangent to each other.

13. The recorded medium of claim 9, further comprising, after the storing of the coordinates of the first determination point as print data:

selecting a second determination point, the second determination point separated by a unit distance from the first determination point in a direction towards an inside of the junction area;

comparing a distance from the first determination point to the second determination point with the value P; and moving the second determination point by a unit distance towards the inside of the junction if the distance from the first determination point to the second determination point is less than the value P.

14. The recorded medium of claim 13, further comprising, if the distance from the first determination point to the second determination point is greater than or equal to the value P:

comparing a distance from a center of the pad to the second determination point with the value (R−r+P); and storing coordinates of the second determination point as print data if the distance from the center of the pad to the second determination point is less than the value (R−r+P).

15. The recorded medium of claim 9, further comprising, after the storing of the coordinates of the first determination point as print data:

selecting a third determination point, the third determination point separated by a unit distance from the first determination point in a direction parallel to one side of the junction area;

comparing a distance from the first determination point to the third determination point with the value P; and moving the third determination point by a unit distance in a direction parallel to one side of the junction area if the distance from the first determination point to the third determination point is less than the value P.

16. The recorded medium of claim 15, further comprising, if the distance from the first determination point to the third determination point is greater than or equal to the value P:

comparing a distance from a center of the pad to the third determination point with the value of (R−r+P); and storing coordinates of the third determination point as print data if the distance from the center of the pad to the third determination point is greater than or equal to the value of (R−r+P).

* * * * *